US008137202B2

(12) United States Patent
Tseng

(10) Patent No.: US 8,137,202 B2
(45) Date of Patent: Mar. 20, 2012

(54) INTEGRATED ELECTRONIC GAME SYSTEM WITH PLAYER-END GAMES CORRESPONDING TO SERVER-END GAMES

(76) Inventor: Tzu-Hsiang Tseng, Taichung (TW)

( * ) Notice: Subject to any disclaimer, the term of this patent is extended or adjusted under 35 U.S.C. 154(b) by 275 days.

(21) Appl. No.: 12/656,035

(22) Filed: Jan. 14, 2010

(65) Prior Publication Data

US 2011/0172006 A1 Jul. 14, 2011

(51) Int. Cl.
*G06F 17/00* (2006.01)
*G06F 19/00* (2006.01)
*A63F 9/24* (2006.01)
*A63F 13/00* (2006.01)

(52) U.S. Cl. ........................................... 463/42; 463/40

(58) Field of Classification Search .............. 463/40–42; 709/203, 205, 206

See application file for complete search history.

(56) References Cited

U.S. PATENT DOCUMENTS

| | | | | |
|---|---|---|---|---|
| 6,012,984 | A * | 1/2000 | Roseman | 463/42 |
| 6,280,328 | B1 * | 8/2001 | Holch et al. | 463/42 |
| 6,315,668 | B1 * | 11/2001 | Metke et al. | 463/42 |
| 6,625,578 | B2 * | 9/2003 | Spaur et al. | 705/14.5 |
| 7,771,276 | B2 * | 8/2010 | Beatty et al. | 463/27 |
| 8,033,915 | B2 * | 10/2011 | Saito et al. | 463/42 |
| 2006/0258462 | A1 * | 11/2006 | Cheng et al. | 463/42 |
| 2007/0213135 | A1 * | 9/2007 | Aida | 463/42 |
| 2008/0076551 | A1 * | 3/2008 | Okada | 463/31 |
| 2008/0261699 | A1 * | 10/2008 | Topham et al. | 463/42 |
| 2009/0062013 | A1 * | 3/2009 | Williams et al. | 463/42 |
| 2010/0113158 | A1 * | 5/2010 | Chapman et al. | 463/42 |

* cited by examiner

*Primary Examiner* — Milap Shah
(74) *Attorney, Agent, or Firm* — Bacon & Thomas, PLLC

(57) ABSTRACT

An integrated electronic game system includes multiple game controllers for executing different games, multiple game consoles disposed in communication with one another and having carried therein different games, a central control server connected between the game controllers and the game consoles for linking the game controllers and the game consoles that execute one same game, a driver connected with the game consoles for receiving a card-opening signal from each game console and outputting a respective operation instruction, and a physical card-opening device connected to the driver and controllable by the operation instruction outputted by the driver to execute the card-opening operation of the game of one game console. Thus, different games share one common physical card-opening device, and the player can operate one game controller to switch among different games, thereby improving game system utilization, raising the player's overall interest and reducing equipment costs.

8 Claims, 2 Drawing Sheets

INTEGRATED ELECTRONIC GAME SYSTEM WITH PLAYER-END GAMES CORRESPONDING TO SERVER-END GAMES

BACKGROUND OF THE INVENTION

1. Field of the Invention

The present invention relates to electronic game technology and more particularly, to an integrated electronic game system, which combines different electronic games with one common physical card-opening device.

2. Description of the Related Art

In every amusement part or game center, there are many different game systems for playing different games. These game systems are commonly of single PC design, i.e. one single game system has only one game built therein. To raise player's overall interest, network game systems are created to attract people. These network game systems allow rapid accumulation of points or money so that the final winner can get a large amount of money as a feedback.

However, most of the game systems are waiting for the players or most of the players are waiting for the game systems during the game. For example, one physical card-opening device (for example, mechanical arm) can start to issue cards only after the player has inputted the points or money, and the player must wait when the mechanical arm is issuing the cards. Thus, these game systems have a low utilization, and the game takes too long to play. In consequence, the players cannot enjoy the game. These problems are more serious in network game systems. Further, a physical card-opening machine is quite expensive. Low system utilization results in high equipment cost.

SUMMARY OF THE INVENTION

The present invention has been accomplished under the circumstances in view. It is the main object of the present invention to provide an integrated electronic game system, which improves game system utilization, raises the player's overall interest and reduces equipment costs.

To achieve this and other objects of the present invention, an integrated electronic game system includes multiple game controllers for executing different games, multiple game consoles disposed in communication with one another and having carried therein different games, a central control server connected between the game controllers and the game consoles for linking the game controllers and the game consoles that execute one same game, a driver connected with the game consoles for receiving a card-opening signal from each game console and outputting a respective operation instruction, and a physical card-opening device connected to the driver and controllable by the operation instruction outputted by the driver to execute the card-opening operation of the game of one game console.

DETAILED DESCRIPTION OF THE INVENTION

Figure 1:
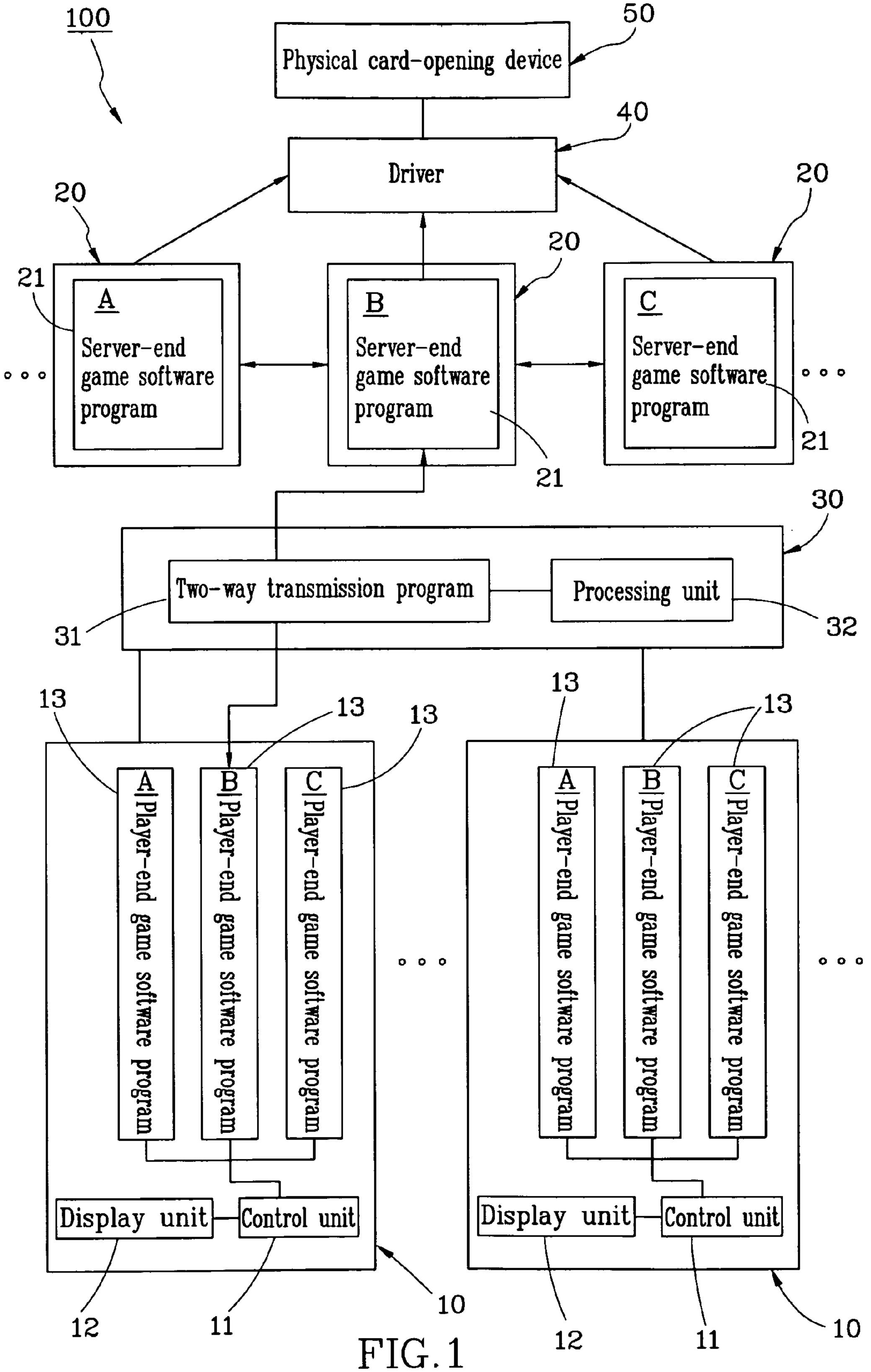
FIG. 1 is a system block diagram of an integrated electronic game system in accordance with the present invention.
Figure 2:
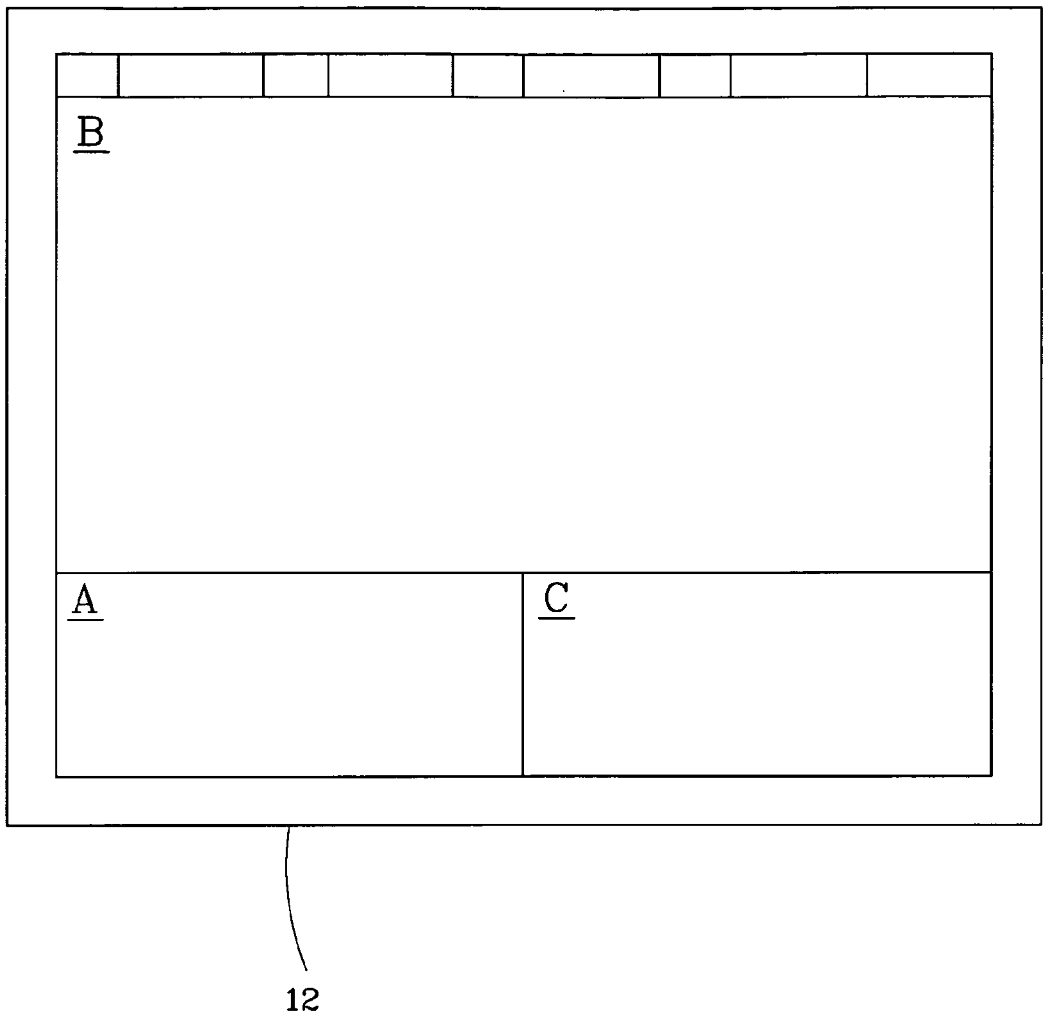
FIG. 2 is a game picture frame of the integrated electronic game system in accordance with the present invention.

Referring to FIGS. 1~3, an integrated electronic game system 100 in accordance with the present invention is shown comprising a plurality of game controllers 10, a plurality of game consoles 20, a central control server 30, a driver 40 and a physical card-opening device 50.

Each game controller 10 comprises a control unit 11 and a display unit 12, and has installed therein a plurality of different player-end game software programs 13 (for example, player-end game software program A, player-end game software program B and player-end game software program C). The player can use the game controllers 10 to input instructions including switching and executing the related player-end game software programs 13.

Each game console 20 has installed therein at least one, for example, but not limited to, one server-end game software program 21. The server-end game software programs 21 of the game consoles 20 are different. According to the present preferred embodiment, server-end game software programs A, B and C are respectively installed in the game consoles 20. Further, the game consoles 20 are put in communication with one another subject to TCP/IP communication protocol. The communication content includes the information of the current progress of the server-end game software program 21 running in each game console 20. This information is well stored so that the game consoles 20 can know from one another the respective progress. Thus, the player can know, through the respective game controllers 10, the progress of every server-end game software program 21 running in each of the game consoles 20, and can send a card-opening signal to the driver 40 one after another subject to the current progress every server-end game software program 21 running in each of the game consoles 20 (this part will be described further). With respect to equipment, it simply needs to establish connection among the game consoles 20 by means of conventional technology, and therefore the invention saves the cost. It is to be understood that the main point of the present invention is let the game consoles 20 be in communication with one another. As the communication connection technique and the related data transmission and recording methods are of the known art, no any further detailed description in this regard is necessary.

The central control server 30 is connected between the game controllers 10 and the game consoles 20. According to the present preferred embodiment, the central control server 30 comprises a two-way transmission program 31 and a processing unit 32. The two-way transmission program 31 is capable of receiving a switching instruction from one of the game controllers 10 and then connecting the respective player-end game software program 13 to the respective server-end game software program 21, for example, connecting the player-end game software program B to the server-end game software program B shown in FIG. 1 for enabling the player to play the game B. If the game B involves any common information shared by the game A and the game C during playing of the game (such as the points to be deducted or added to the player), the common information will be calculated and recorded by the processing unit 32 of the central control server 30, reducing the burden of the game consoles 20 and the cost resulted from the installation of complicated connection equipment.

Based on the aforesaid architecture, the invention achieves the function that the player can operate the respective game controller 10 to switch among multiple games that are running at the same time. However, the aforesaid architecture may be alternated by other configurations; for example, multiple different game software programs can be respectively stored in multiple game consoles, and every game controller can be connected to the respective game console through the central control server to receive and output the game information transmitted from the game software program of the respective game console, i.e., it is not necessary to install any game software program in every game controller. It is to be understood that the aforesaid architecture is simply an example for illustration but not to be used as a limitation.

By means of a switching operation, every game controller 10 can share multiple game consoles 20. The following will describe how the game consoles 20 share one physical card-opening device 50.

The technique measure of the present invention is to connect the driver 40 to the game consoles 20 for enabling the driver 40 to receive a card-opening signal from each of the game consoles 20 and to output an operation instruction to the connected physical card-opening device 50 (for example, mechanical arm; mechanical arm is not a limitation, the physical card-opening device can be a lottery machine or any of a variety of other automatic gambling devices) upon receipt of the card-opening signal. Further, the operation instruction outputted by the driver 40 contains the information of the source game console that issued the card-opening signal (for example, the game console 20 that carries the server-end game software program A). Subject to the operation instruction from the driver 40, the physical card-opening device 50 starts the card-opening operation of the game A. Thus, all the games A~C can share the physical card-opening device 50 commonly without confliction.

The game operation flow of the present invention subject to the use of the game controllers 10 and the game consoles 20 that carry the games A~C is described hereinafter:

At first, when the physical card-opening device 50 is running the card-opening operation of the game A, the player using one game controller 10 can switch to the game B, i.e., the player can operate the respective game controller 10 to send a switching instruction through the control unit 11 to the central control server 30, causing the central control server 30 to connect the player-end game software program B of the respective game controller 10 to the game console 20 carrying the server-end game software program B (see FIG. 1), so that the respective server-end game software program 21 control running of the respective player-end game software program 13 via the central control server 30, at the same time, the player can control the control unit 11 to run the player-end game software program 13 in playing the game B and to give a response or issue an instruction to the game console 20 carrying the server-end game software program B via the central control server 30.

At the same time, the game consoles 20 carrying the server-end game software programs A and C keep running the respective server-end game software programs A and C and sending the respective progress information to the game console 20 carrying the server-end game software program B. At this time, the game controller 10 carrying the player-end game software program B is connected to the game console 20 carrying the server-end game software program B through the central control server 30 to fetch the progress information of the server-end game software programs A and C for output through the display unit 12 thereof, as shown in FIG. 2. Thus, the player can know the progress of every of the games A~C.

Further, after the physical card-opening device 50 finished the card-opening operation of the game A, the game console 20 carrying the server-end game software program A will inform the game consoles 20 carrying the server-end game software programs B and C. At this time, subject to the current progress, one of the other two game consoles, for example, the game consoles 20 carrying the server-end game software program B will send a card-opening signal, causing the physical card-opening device 50 to start the card-opening operation of the game B without delay, thereby improving game system utilization.

In conclusion, by means of the application of the integrated electronic game system of the present invention, every game controller carrying multiple player-end game software programs allows the player to play different games at the same time by means of a switching operation, and these different games can communicate with one another to share one common physical card-opening device without confliction. Thus, the player can switch among different games without waiting, thereby improving game system utilization, raising the player's overall interest and reducing equipment costs.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An integrated electronic game system, comprising:

a plurality of game controllers each executing a plurality of different player-end game software programs;

a plurality of game consoles each executing a server-end game software program and disposed in communication with one another, wherein each server-end software program is different and respectively corresponds to one of the plurality of different player-end game software programs;

a central control server connected between said game controllers and said game consoles for linking said game controllers and said game consoles that execute a same game of one of the player-end game software programs and one of the server-end game software programs for two-way communication;

a driver connected with said game consoles respectively for receiving a card-opening signal from each said game console and outputting a respective operation instruction; and only one physical card-opening device connected to said driver and controllable by the respective operation instruction outputted by said driver to execute a card-opening operation of one of the server-end game software programs of one of said game consoles.

2. The integrated electronic game system as claimed in claim 1, wherein each said game controller comprises a control unit, said control unit enabling the player to input an instruction to select and run said player-end game software programs; and said central control server comprises a two-way transmission program configured to receive the instruction inputted by the player and connect one of the plurality of different player-end game software programs selected by the player to the corresponding server-end game software program of the same game.

3. The integrated electronic game system as claimed in claim 1, wherein said game consoles have a function of informing one another the current progress of the server-end game program they currently run and a function of storing therein the current progress of the respective server-end game software program they currently run.

4. The integrated electronic game system as claimed in claim 3, wherein each said game console determines to output the card-opening signal to said driver subject to the current progress of the respective server-end game software program they currently run.

5. The integrated electronic game system as claimed in claim 3, wherein each said game controller fetches the current progress of each of the server-end game software programs in the respective game console through said central control server.

6. The integrated electronic game system as claimed in claim 5, wherein each said game controller further comprises a display unit for output of the current progress of each of the server-end game software program fetched from the respective game console.

7. The integrated electronic game system as claimed in claim 1, wherein each said central control server comprises a processing unit adapted for calculating and recording the information shared by all the server-end game software programs.

8. The integrated electronic game system as claimed in claim 1, wherein said physical card-opening device is a mechanical arm.

* * * * *